US010926968B2

(12) United States Patent
Berveiler et al.

(10) Patent No.: US 10,926,968 B2
(45) Date of Patent: Feb. 23, 2021

(54) SYSTEM FOR REMOVING AND COLLECTING DUST PARTICLES

(71) Applicant: BGRS, Inc., Houston, TX (US)

(72) Inventors: Peter C. Berveiler, Katy, TX (US); Martin E. Boros, Spring, TX (US)

(73) Assignee: BGRS, INC., Houston, TX (US)

( * ) Notice: Subject to any disclaimer, the term of this patent is extended or adjusted under 35 U.S.C. 154(b) by 265 days.

(21) Appl. No.: 15/952,653

(22) Filed: Apr. 13, 2018

(65) Prior Publication Data

US 2019/0315583 A1    Oct. 17, 2019

(51) Int. Cl.
| *B01D 45/00* | (2006.01) |
| *B65G 69/18* | (2006.01) |
| *E21B 41/00* | (2006.01) |
| *B01D 45/04* | (2006.01) |
| *B65G 11/20* | (2006.01) |
| *E21B 43/267* | (2006.01) |
| *B01F 13/00* | (2006.01) |
| *B23K 35/40* | (2006.01) |

(52) U.S. Cl.
CPC .......... *B65G 69/186* (2013.01); *B01D 45/04* (2013.01); *B65G 11/20* (2013.01); *E21B 41/00* (2013.01); *B01F 13/0037* (2013.01); *B23K 35/406* (2013.01); *B65G 69/181* (2013.01); *B65G 69/182* (2013.01); *B65G 2201/045* (2013.01); *E21B 43/267* (2013.01)

(58) Field of Classification Search
CPC .............................. B65G 69/186; B65G 11/20; B65G 2201/045; B65G 69/181; B65G 69/182; B65G 11/00; B01D 45/04; E21B 41/00; E21B 43/267; B01F 13/0037; B23K 35/406
See application file for complete search history.

(56) References Cited

U.S. PATENT DOCUMENTS

| 370,142    | A | * | 9/1887  | Holcomb ............. F24B 13/008 126/242 |
| 2,677,437  | A | * | 5/1954  | Wagner ................. B01D 45/02 55/445 |
| 3,926,290  | A | * | 12/1975 | Isojima .................. B63B 27/28 193/27 |
| 4,061,221  | A |   | 12/1977 | Higashinaka et al. |
| 4,202,280  | A | * | 5/1980  | Bereiter .................... F23G 5/46 110/216 |
| 4,225,033  | A | * | 9/1980  | Fukagai ............... B65G 69/186 141/93 |
| 4,521,232  | A |   | 6/1985  | Howeth |
| 4,811,889  | A |   | 3/1989  | Dackus et al. |

(Continued)

Primary Examiner — Dung H Bui
(74) Attorney, Agent, or Firm — Seyfarth Shaw LLP; George S Haight

(57) ABSTRACT

Embodiments of the present disclosure describe a system for capturing dust and dust-laden air caused by the agitation, movement or transfer of particulate material. The system includes a dust collection assembly positioned proximate and associated with the delivery of particulate material to capture dust particles released by movement and settling of the particulate material when being dispensed and delivered. The dust collection assembly is positioned to direct an air flow in a flow path overlying the dust particles to capture the dust particles and move the dust particles away from the proppant thereby reducing risk of dust exposure.

18 Claims, 8 Drawing Sheets

(56) References Cited

U.S. PATENT DOCUMENTS

| | | | |
|---|---|---|---|
| 5,154,271 A | 10/1992 | Binzen | |
| 5,687,657 A * | 11/1997 | Ziegler | F22B 37/008 110/234 |
| 2005/0150439 A1 * | 7/2005 | Ryan | F23J 3/04 110/216 |
| 2014/0090560 A1 * | 4/2014 | Buzanowski | B01D 39/10 95/287 |
| 2016/0273766 A1 * | 9/2016 | Oda | B01D 45/06 |
| 2016/0368721 A1 * | 12/2016 | Haraway | B65G 11/206 |
| 2017/0247209 A1 | 8/2017 | Oren et al. | |
| 2017/0328564 A1 * | 11/2017 | Oda | F23J 15/022 |

* cited by examiner

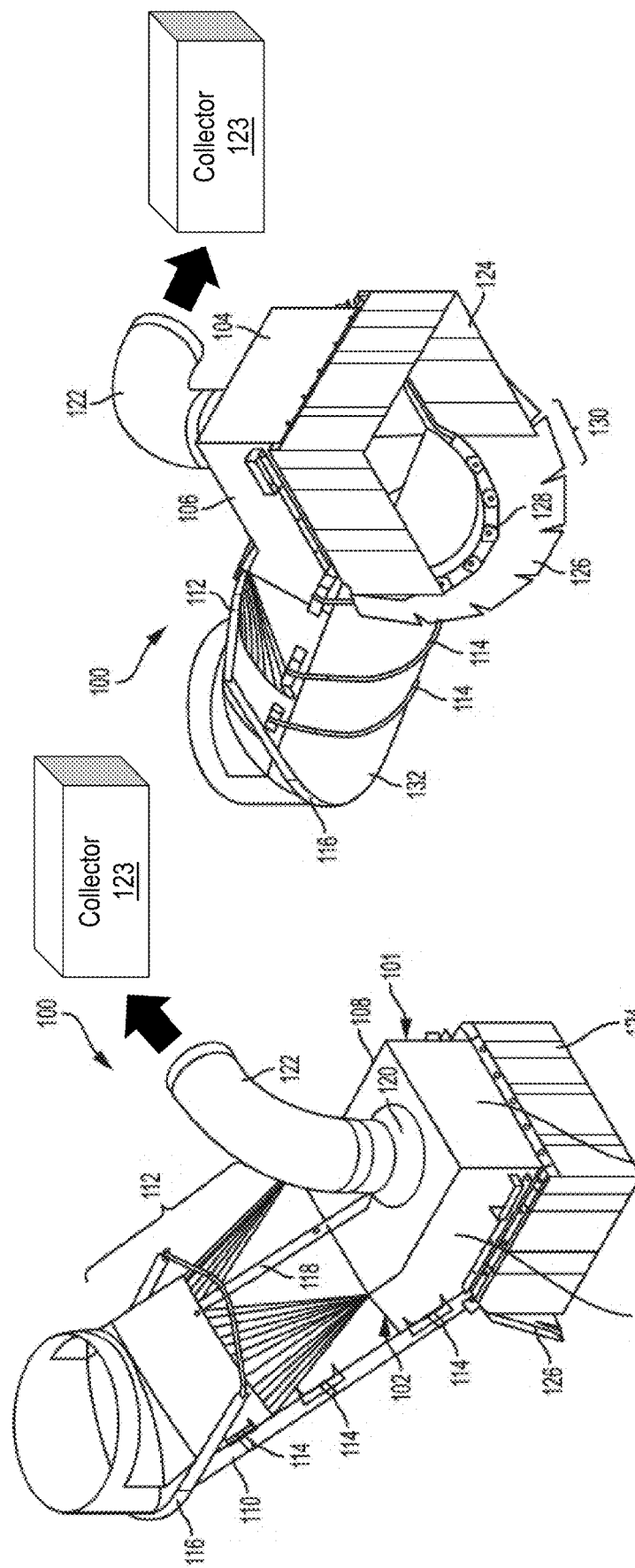

SYSTEM FOR REMOVING AND COLLECTING DUST PARTICLES

FIELD OF INVENTION

The present invention relates to de-dusting proppant and collecting dust particles. More particularly, the present invention relates to systems to collect dust particles formed during the movement of a volume of particulate material, such as a proppant used in an oilfield fracking operation.

BACKGROUND

In large scale drilling, boring, proppant handling, hydraulic fracking or other operations, there is a need to move, mix, or otherwise agitate particulate materials, such as sand or proppant. Particulate materials may be moved from storage receptacles to delivery receptacles using powerful air-movers, conveyor belts, gravity flows and/or other mechanisms. Moving a large volume of particulate material using air-movers (such as a pressure blower delivery assembly) causes the agitation of granular solids as the material is moved through hoses, ducts, chutes and containers. Such agitation may produce dust particles which may be inhaled by operations personnel or sucked into mechanical equipment. Air-born particles, of very small dimensions may not settle quickly and may remain airborne for an extended period of time. Inhalation by operations personnel may have a negative health impact, and mechanical equipment may be damaged by the dust particles clogging filters and reducing air flow to the equipment.

Existing vacuum and other containment systems may be implemented through the use of a hood assembly attached to a delivery chute to reduce the amount of micro-particles or dust. As the material flows through ducts or chutes into a containment hood, directed air-flow, updrafts, and negative pressure, is applied inside of the hood directing the micro-particles and dust into a dust collection assembly and one or more receptacles to receive and collect the dust. Flexible curtains may be used to contain the air-born particles until they are collected by the directed air-flow, updrafts, and negative pressure of the containment system. The suction point of these systems, however, may exist inside of the hood assembly and, as such, create upward turbulent air flow of the micro-particles or dust and downward or crossways for heavier particles being delivered to the delivery site or receptacle. The undirected cross-flow source air through these materials delays the separation of the dust from the usable material and results in an inefficient delivery of material and collection of damaging dust.

SUMMARY

Disclosed herein are systems and methods for active de-dusting type dust control that operate by removing dust-laden air from a solids handling transfer system up-stream of the discharge point with the use of any vacuum blower or fan, interconnecting ductwork and a de-dusting hood with a controlled source of supply air. Embodiments disclosed herein include a compact hood that attaches to an open or closed discharge chute with a known or controlled air source that more efficiently and more effectively removes dust particles from the air upstream of the end of the existing-equipment discharge point and maximize delivery usable particulate materials to a delivery point.

According to one embodiment, a system for capturing dust particles, while minimizing the capture of usable proppant, the system may include a hood assembly defining an orifice sized and shaped to receive a delivery chute. The system also may include a dust receptacle coupled to the hood. The dust receptacle may be in fluid communication with an air-mover that is configured to provide suction to the hood. An upstream de-dusting encasement may be affixed to the hood and secured to the delivery chute by a fastener. The upstream de-dusting encasement may be sized and shaped to match the geometry of the delivery chute. The encasement may have a de-dusting air-intake configured to produce a suction point, from the air mover, upstream of the hood.

According to another embodiment, a dust collection assembly for collecting dust-laden air produced by the agitation of a particulate material is disclosed. The assembly may comprise a hood assembly defining an orifice to match an external geometry of a delivery chute and a dust receptacle coupled to the hood. The dust receptacle in fluid communication with an air-mover configured to provide suction to the hood. The assembly may further include an upstream pick-up affixed to and extending upstream from the hood. An upper portion of the upstream pick-up may be sized and shaped to match an internal geometry of the delivery chute. The upstream pick-up may comprise a diffuser in an upstream-facing wall. The assembly also may include a receiving fastener affixed to the hood and configured to receive and secure the delivery chute to the hood assembly.

Additional features of the de-dusting assembly may include a pressure diffuser disposed between the delivery chute and the dust receptacle, a pick-up shaped to match the geometry of the delivery chute and affixed to the hood about the orifice, a flexible curtain affixed to a lower portion of the hood, an auxiliary suction hood in fluid communication with the air mover, a collector in fluid communication with the dust receptacle, a conduit establishing the fluid communication between the dust receptacle and the collector, and vents disposed in the upstream encasement.

BRIEF DESCRIPTION OF DRAWINGS

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

FIG. 1 is a perspective view of a dust control system 100 according to an embodiment of the invention.

FIG. 2 is a bottom-perspective view of the dust-collection system depicted in FIG. 1.

DETAILED DESCRIPTION

Figure 3:
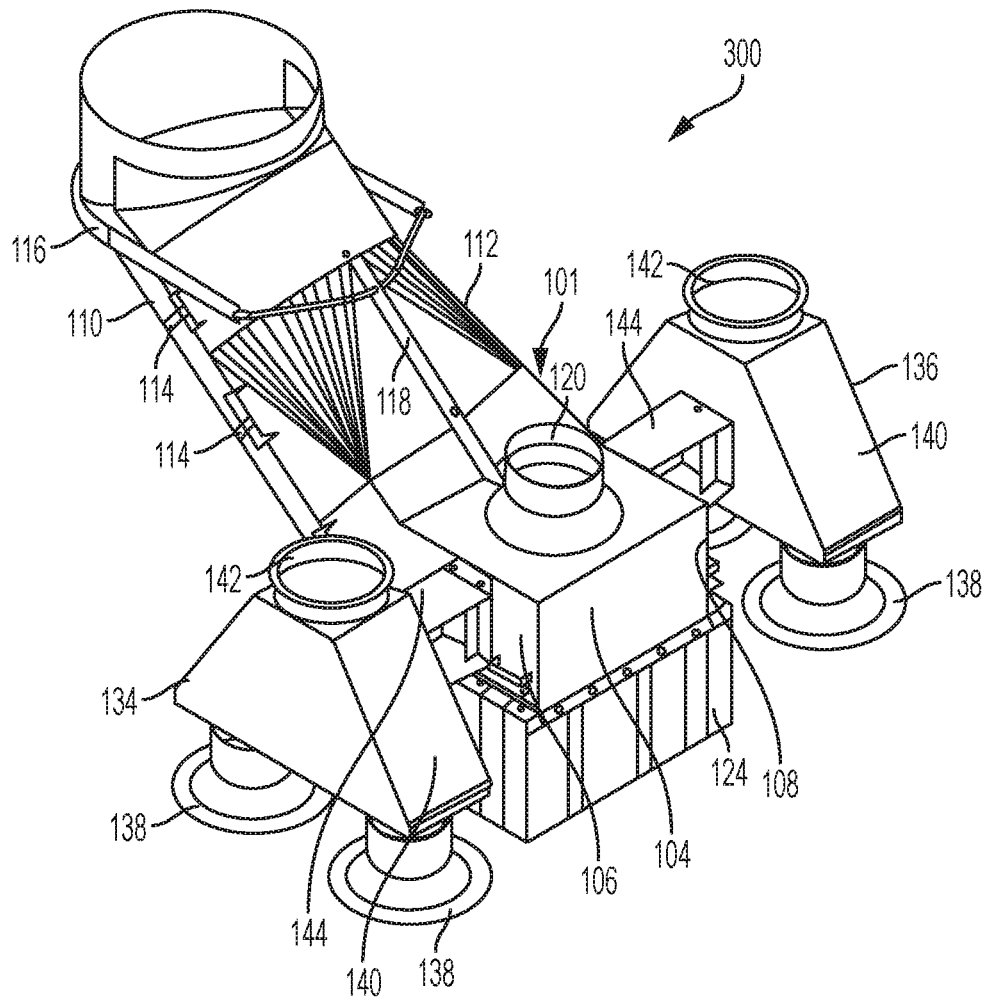
FIG. 3 depicts an extended dust control system according to an embodiment of the invention.

Aspects of the invention will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Embodiments of the present invention include an active dust control system that may operate by removing dust laden air from a particulate handling transfer system with the use of a vacuum blower or fan, interconnecting ductwork and a de-dusting hood. In one illustrious example, ultrafine dust may be generated during oil field operations, such as the movement of proppant through physical or pneumatic conveying on an oilfield fracking site. The proppant is a particulate material, and when the particles collide, fragments of the particles that break or shear off during collisions become ultrafine dust. The ultrafine dust has particles small enough to become airborne and persist in the atmosphere for a prolonged period of time. The dust particles may be made up of silica, chief cause of silicosis, and particularly silica in planar and sub-rounded forms from collisions in multiple processes leading to the introduction of proppant into the fracking fluid mixing device. The ultrafine particles can pass through many forms of containment and present an inhalation hazard to humans and animals and cause additional required maintenance to other non-associated engines, pumps and other devices using ambient air as a source.

In certain uses, particulate matter departs from a bulk storage container or vessel and is moved to a material receiving hopper through a series of belts or pneumatically-driven systems to deposit via gravity through an open or closed chute into a mixing or receiving hopper. The ultrafine dust may be released into and sustained in the atmosphere as the proppant leaves the discharge chute and as the particulate matter lands in the mixing or receiving hopper.

Aspects of the dust control system described herein may include any vacuum generation device sufficient to provide appropriate flow, any conduits and ductwork capable of providing sufficient high flow and moderate vacuum, and a de-dusting hood disposed over the mixing or receiving hopper. Light ultrafine silica or dust particles typically remain in the air longer than heavier particles and can travel substantial distances in the air if not contained. The de-dusting hood may be used to limit the migration of the ultrafine proppant dust and air conveyed into the mixing or receiving hopper, and to direct air flow and dust-laden air up and into the ductwork connected to a chute above the mixing or receiving hopper and onto a dust collection system or collector.

FIG. 1 is a perspective view of a de-dusting dust capture and control system 100 according to an embodiment of the invention. In the illustrated embodiment, the dust control system 100 may include a de-dusting hood assembly 101 forming a substantially enclosed area formed by a top wall 102, a front wall 104, and sidewalls 106, 108, all of which may be considered to be a part of the hood or hood transition prior to discharge of proppant into the receiving or blending hopper. An upstream encasement 112 may be coupled to the top wall 102 and may be sized and positioned to substantially surround the chute 110 delivering the proppant. The upstream extension/encasement 112 may be coupled or secured to the chute 110 by one or more straps 114, clamps, bolts, or other suitable fasteners required to connect to and enclose an open-top conveyance and control airflow into and out of the de-dusting equipment. The upstream encasement 112 may be further coupled to the delivery chute 110 by a supporting bracket 116 extending through and from a substantially perpendicular flange 118 and wrapping around an upper portion of the chute 110. Proppant delivered through the chute 110 may flow into the enclosed area formed by the upstream encasement 112 and de-dusting hood 101 toward the receiving hopper or delivery site. As explained in greater detail below, the upstream encasement 112 of the proppant discharge chute 110 may inhibit cross-draft during transfer of proppant and dust-laden air from the delivery chute 110, and assist in maintaining a more-laminar flow along the chute 110 into the de-dusting hood 101.

The top portion of the de-dusting hood 101 may include one or more dust receptacles 120 coupled to a tube or duct 122 to direct the dust particles away from the receiving hopper and toward a dust collector 123. The de-dusting hood 101 may be paired with a series of purpose-fit sized flexible or rigid ductwork, such as tubing 122, with flow control devices and a fixed- or variable-speed dust collector 123, depending on application, to optimize capture efficiency of ultra-fine and fine dust, and minimize capture of desirable proppant particles. An air mover may draw, via suction, vacuum or other drawing force, the dust-laden air from the volume below the de-dusting hood through the tubing 122 and move the dust-laden air to the dust collector 123. The tubing 122 may be flexible tubing (e.g., polymer tubing, flexible metal, etc.) to simplify installation of the system and promote the efficient movement of dust-laden air to a dust collector. While the illustrated embodiment includes one dust receptacle 120, in other embodiments any suitable number of dust receptacles extending from the top of the de-dusting hood section 101.

The de-dusting hood may include flexible curtains 124 extending downwardly from the bottom of the de-dusting hood 101 toward the receiving hopper or delivery site. The curtain 124 may be formed from flexible sheets (e.g., plastic) to form a volume between the de-dusting hood 101 and the delivery hopper that may shape the incoming flow of air to inhibit cross draft and loss of ultrafine particles. It should be appreciated that in certain embodiments, the curtain 124 may be a single unit having no gaps and wrapping around the perimeter of the de-dusting hood or a portion of the perimeter. However, in other embodiments, the curtain 124 may include multiple strips or sections that are independently moveable from one other. The curtain 124 may be positioned and aligned to block the dust particles from dispersing out and away from the area below the de-dusting hood 101 thereby enhancing the collection of dust. For example, in certain embodiments, the hood assembly 100 may be lowered into a receiving hopper such that the curtain 124 is in contact with a proppant pile delivered to the receiving hopper. In this manner, the dust particles may be contained within the volume inside the curtain 124 as the proppant flows from the chute 110 to the proppant pile. A flexible curtain with minimal air inlets to minimize cross-draft 126 may be coupled to the de-dusting hood 101 near the back side of the de-dusting hood 101 and the end of the delivery chute 110.

FIG. 2 is a bottom-perspective view of the de-dusting dust-collection system 100 depicted in FIG. 1. As seen from the bottom-perspective view of the present embodiment the straps 114 may couple the upstream encasement to the delivery chute 110. Additionally, the bottom-perspective view depicts the flexible curtain 126 in greater detail. The flexible curtain 126 may include a coupling edge 128 sized and shaped to match the outer perimeter or circumference of the delivery chute 110 to form a sealing engagement with the chute 110 and a more enclosed volume immediately below the de-dusting hood 101. The curtain 126 may include multiple fins or flaps 130 promoting the flexibility of the curtain and the directionality of proppant flow.

One advantageous feature of the present embodiment allows the modular assembly of the de-dusting hood to an existing open-top delivery chute shape or geometry. For example, as depicted in FIGS. 1-2, the de-dusting dust collection system 100 may be adapted to fit an existing delivery chute 110 that is substantially round with angled elbow 132. As explained below, the upstream encasement may be clamped over the existing delivery chute 110 and take advantage of active vents to control and dictate air-flow from the delivery chute 110 through the upstream encasement 112 and de-dusting hood 101.

FIG. 3 depicts an extended dust control system 300 according to an embodiment of the invention. The dust control system 300 may include several of the components of the system previously described in conjunction with FIGS. 1-2, including the de-dusting hood 101, the upstream encasement 112, straps 114, support bracket 116 and the flexible curtain 124. To further enhance the dust collection system, auxiliary suction hoods 134, 136 may be implemented. The auxiliary suction hoods 134, 136 may be used to provide further environmental suction to collect dust-laden air outside of the volume defined by the flexible curtain 124 and curtain 126.

As shown, each auxiliary suction hood 134, 136 may include one or more dust receptacles 138. The auxiliary suction hoods 134, 136 may be coupled to the de-dusting hood by support brackets 144 The support brackets 144 may position the auxiliary suction hoods 134, 136 such that the dust receptacles 138 are positioned to capture dust particles that disperse out and away from the de-dusting hood 101 and/or dust particles formed by the inclusion of the proppant flowing out of the chute 110. The dust receptacles 138 may be coupled to the auxiliary suction hoods 134, 136 extending upward toward the top of the de-dusting hood 101. The auxiliary suction hoods 134, 136 include sloped walls 140 extending upward and converging to outlets 142. Outlets 142 may be coupled to ductwork or tubing in communication with the air-mover suction force. Suction may be provided by an air-mover or other vacuum force to the auxiliary suction hoods 134, 136. In this manner, dust captured by the dust receptacles 138 is channeled upward through the auxiliary suction hoods 134, 136 and into the ducting leading to the dust collector.

Figure 4:
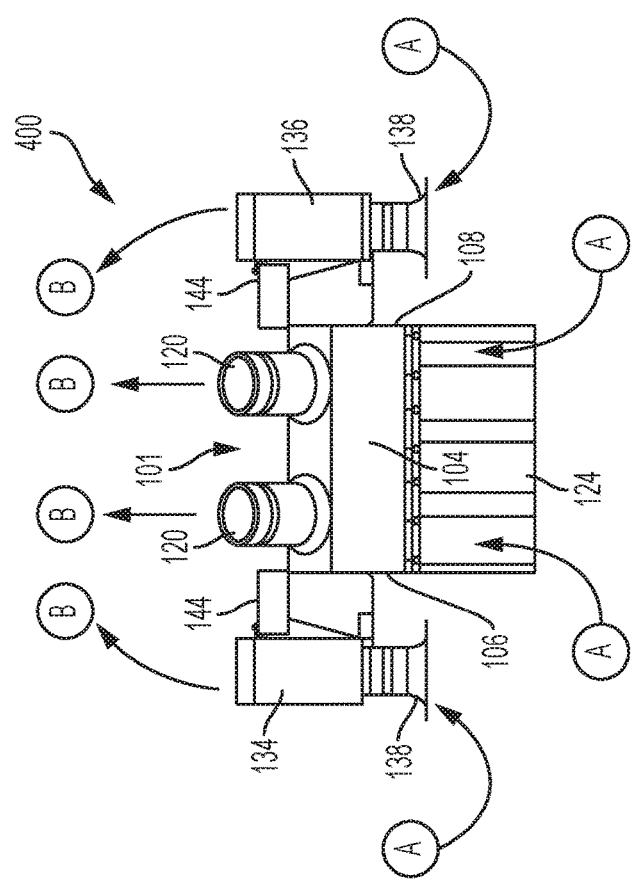
FIG. 4 is a front elevation view of a dust control system according to an embodiment of the invention.

FIG. 4 is a front elevation view of a dust control system 400 according to an embodiment of the present invention. In the illustrated embodiment, the de-dusting hood 101 is defined at least in part by the front wall 104, and side walls 106, 108. The de-dusting hood 101 of the present embodiment includes two dust receptacles 120. In operation, the de-dusting hood portion of the dust control system 400 may be cantilevered over or lowered slightly into the receiving hopper such that the curtain 124 is in contact with the proppant in the receiving hopper, or such that the curtain 124 is closely positioned to the proppant in the receiving hopper. As a result, as the proppant is delivered through the chute 110 (not shown), gravity may direct the proppant downward below the flexible curtain 124. An updraft of dust-laden air may be created by drawing ambient air A from surrounding volumes into the de-dusting hood 101 and the auxiliary suction hoods 134, 136, thereby drawing the dust-laden air into the dust collection system. The dust-laden air may be moved, via an air-mover or other suction force, into dust receptacles 120, 138, in an airflow B through the tubing or ductwork and to the dust collector, thereby reducing or eliminating unwanted ultrafine dust from the environment surrounding the receiving hopper or delivery site.

Figure 5:
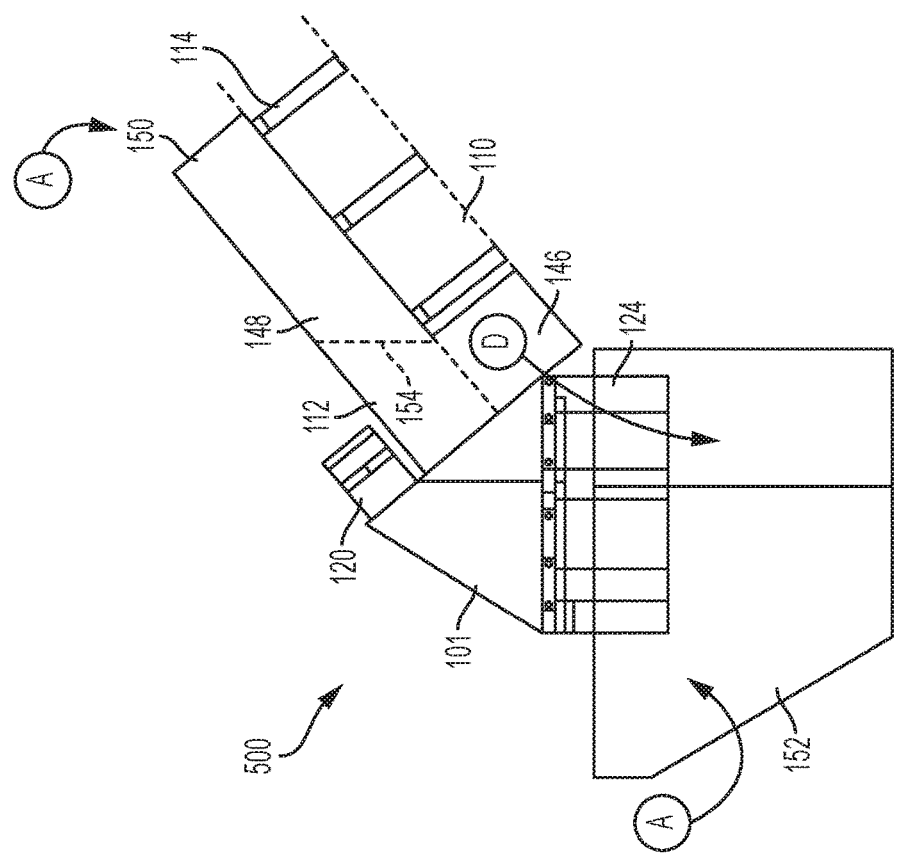
FIG. 5 is a side elevation view of a dust control system according to an embodiment of the invention.

FIG. 5 is a side elevation view of a dust control system 500 according to an embodiment of the present invention. In the illustrated embodiment, the chute 110 is coupled to the upstream encasement 112 using straps 114 and a fitting engagement by which the chute 110 may be slidingly or otherwise engaged with a bottom portion 146 of the upstream encasement and engaged with an appropriate size orifice in the rear wall of the de-dusting hood 101. An upper portion 148 of the upstream encasement 112 may include or form an ambient air intake 150 to assist in directing the flow of dust laden air into the de-dusting hood 101. As shown, the upstream encasement 112 may extend down and over the delivery chute 110 such that as the proppant travels down the chute 110, dust laden air may rise to the upper portion of the upstream encasement 112 into the de-dusting hood 101, into the dust receptacle 120 and onto the dust collector via the airflow B. Proppant discharge D may flow through the bottom portion 146 of the upstream encasement 112 and fall through the volume defined by the flexible curtains 124 and into the receiving hopper 152. Additional ambient air A may be drawn up and under the flexible curtain 124 pushing dust laden air into the de-dusting hood 101. The sloped design of the de-dusting hood 101 may further assist in drawing the dust laden air upwards and into the dust receptacles 120.

While the embodiment depicted in FIG. 5 is depicted without auxiliary suction hoods, one skilled in the art will appreciate that such additional components may be added or removed without deviating from the scope of the invention. In certain instances, the auxiliary suction hoods have been omitted for purposes of clarity.

The implementation of the upstream encasement provides a technical advantage to dust collection systems by moving the suction point of dust laden air from directly below the dust receptacles of the de-dusting hood to a point further upstream. As shown, the present embodiment, through the use of the ambient air intake 150 into the upper portion of the upstream encasement 112, begins to separate the dust laden air from the proppant flow before the proppant arrives at the de-dusting hood. When the proppant and dust laden air arrive at the hood, much of the dust laden air is already captured by the air flow through the upper portion 148 of the upstream encasement 112. The dust laden air then is more easily and efficiently captured by the suction of the dust receptacles 120 and avoids the turbulent cross-flow of particulate matter with dust-laden air.

According to one embodiment, a diffuser 154 may be implemented in the de-dusting dust collection system to further aid the capture and removal of dust laden air. As shown, the present embodiment may include a diffuser 154 in the upstream encasement 112. The diffuser 154 may be in the form of a screen, perforated metal sheets or other airflow reduction device. The diffuser 154 may provide a pressure drop prior to entry into the de-dusting hood 101 in order to maintain a laminar air flow. The laminar air flow reduces the escape of the ultra-fine dust due to uplift and downdraft without cross-draft, where ultrafine particles may rebound into the air-stream as the larger, desired proppant particulate flow lands in the receiving hopper 152. This setup may provide a continuous stream of air to maintain entrainment of the ultrafine dust while reducing the collection of usable proppant in the dust collector to the extent practical.

Figure 6:
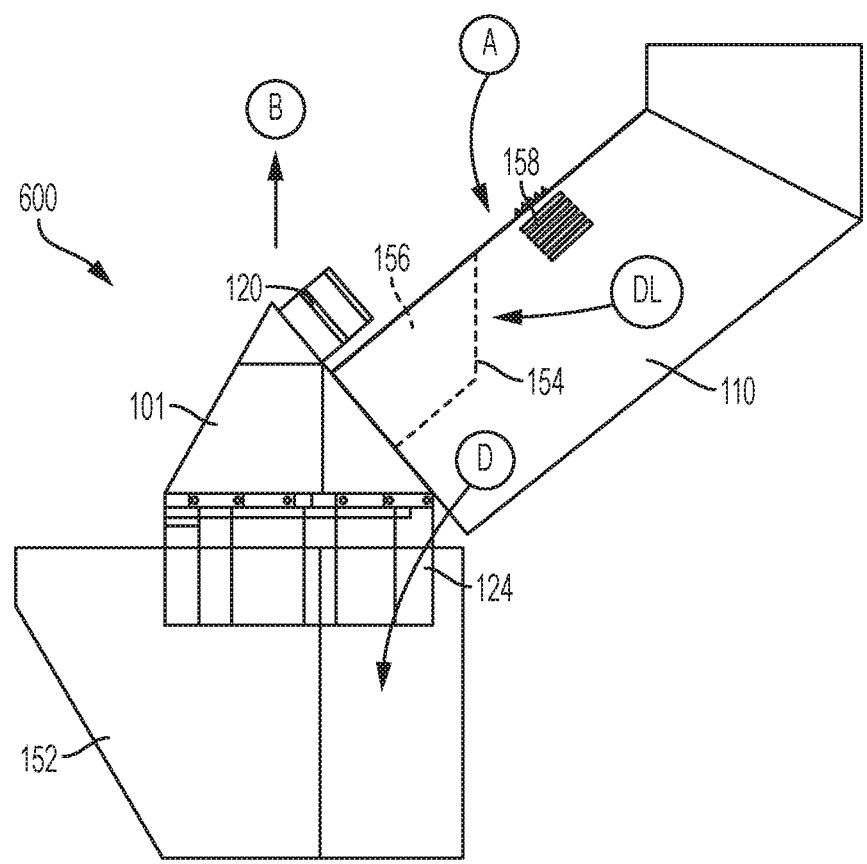
FIG. 6 is a side elevation of a dust control system according to an embodiment of the invention.
Figure 7:
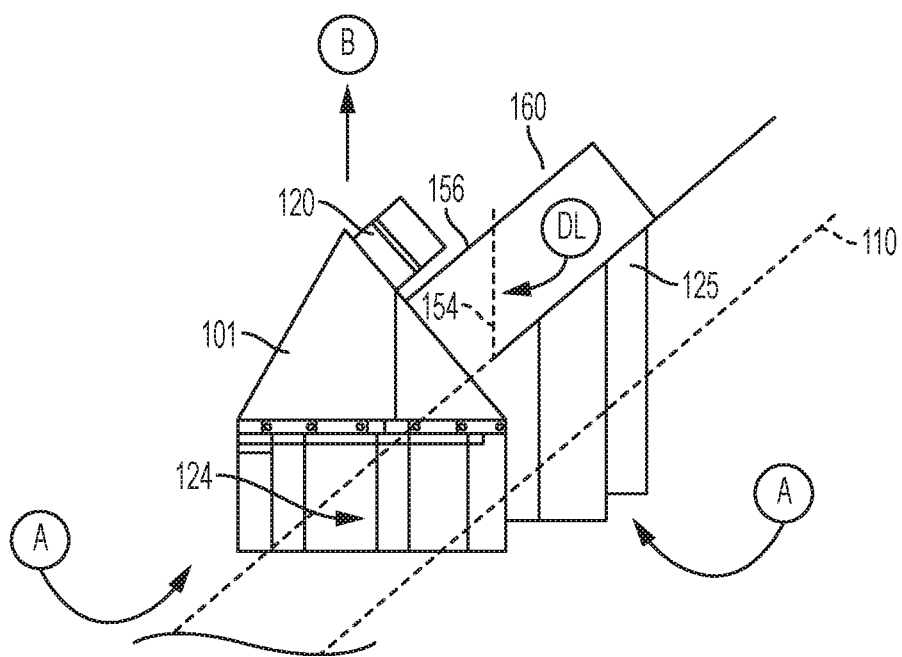
FIG. 7 is a side elevation of a dust control system according to an embodiment of the invention.

FIG. 6 is a side elevation of a dust control system 600 according to an embodiment of the invention. The present embodiment may include a de-dusting hood 101, dust receptacle 120, flexible curtain 124 and receiving hopper 152, as previously described. Additionally, the present embodiment may include a vented discharge chute 110 with an upstream dust pick-up 156.

According to the present embodiment, the delivery chute 110, through which the proppant is delivered, may include one or more vents 158 around and along the delivery chute 110 to allow ambient air flow to enter the chute 110 and assist in creating an appropriate air flow of proppant and dust laden air into the de-dusting hood 101. The vents 158 may be placed around the circumference of the chute 110 to promote efficient and consistent airflow. According to one embodiment, the vents 158 may be placed on the top surface and on opposing sides of the delivery chute 110. The vents 158 may be screened or otherwise protected to ensure no dust laden air escapes the chute 110. The vents may be mechanically operated and adjusted to control ambient air intake and thusly establish and maintain an appropriate air flow through the delivery chute.

The upstream pickup 156 may be a formed structure extending from the rear wall of the de-dusting hood 101 and having a geometry matching that of the inside surface of the delivery chute. As shown, the dust laden air DL may be directed and controlled by the introduction of ambient air flow through the vents 158 to pass through the diffuser 154 of the upstream pick-up 156. The upstream facing wall of the pick-up 156 may include a diffuser screen to provide an adequate pressure drop as the dust laden air flows through the chute 110 and into the de-dusting hood.

As with other embodiments described herein, the proppant discharge D may flow by gravity through the chute 110 and into the receiving hopper 152. The intake of ambient air A up through the volume defined by the flexible curtain 124 may also aid in creating upward air flow of dust laden air into the de-dusting hood.

FIGS. 7-10 depict dust control systems 700, 800 according to an embodiment of the present invention. The dust control systems 700, 800 may include an upstream encasement with a rectangular cover 160 placed over a rectangular delivery chute 110. The dust control system 700 may include a de-dusting hood 101, upstream pick-up 156, one or more dust receptacles 120 and flexible curtains 124 as previously described. The de-dusting hood 101 of the system 800 depicted in FIGS. 8-10 may be substantially triangular and include dust receptacles 120 extending angularly from the top angled wall of the hood 101. According to one embodiment in which the delivery chute may have an extension added, be an open-air chute with extension, the de-dusting dust control system 700 may further include additional curtains 125 extending up the upstream encasement cover 160. The additional curtains 125, when the dust control system 700 is coupled to an open-air delivery chute, may drape over the side of the delivery chute to provide containment of the proppant and dust laden air as it arrives to the de-dusting hood 101. Ambient air A drawn up from below the flexible curtains 124, 125 may also assist the airflow of the system.

As proppant is delivered through the chute 110, the dust laden air DL may rise within the covered upstream encasement and, aided by vents 158 in the cover 160 of the upstream encasement, flow through the diffuser 154 of the upstream pick-up 156 and into the upper portion of the de-dusting hood to be collected by the suction of the dust receptacles 120.

Figure 9:
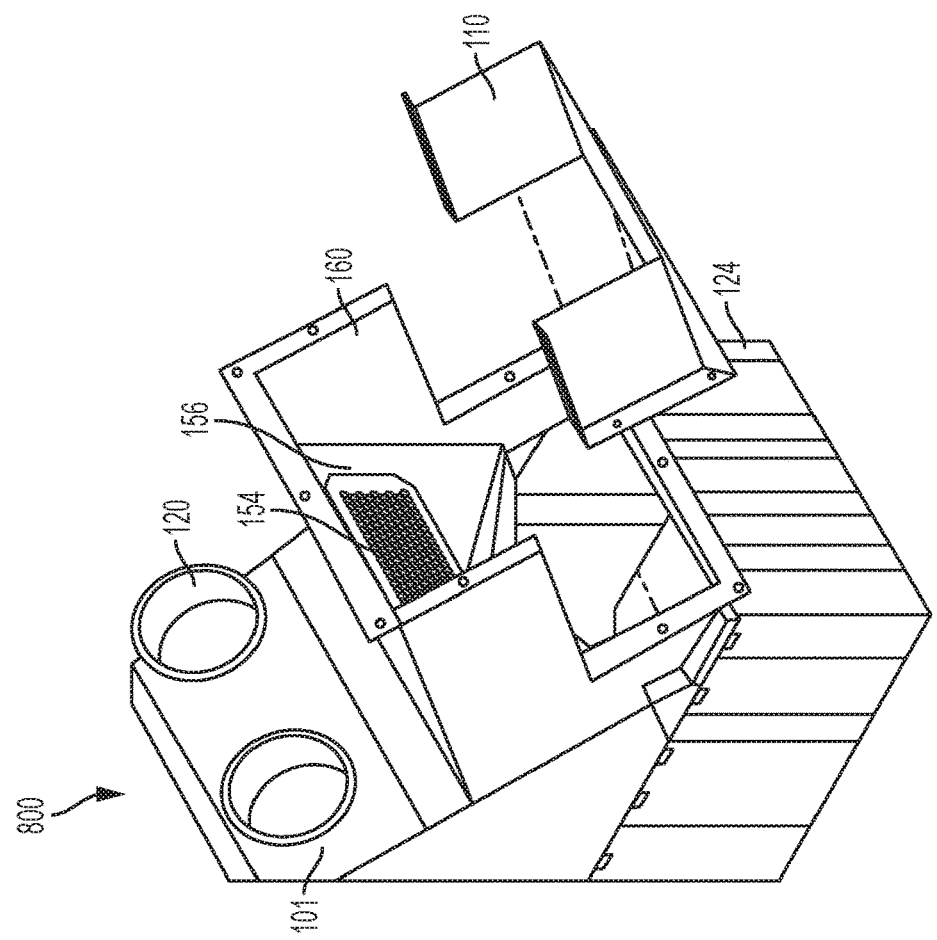
FIG. 9 is an exploded view of a dust control system according to an embodiment of the invention.
Figure 8:
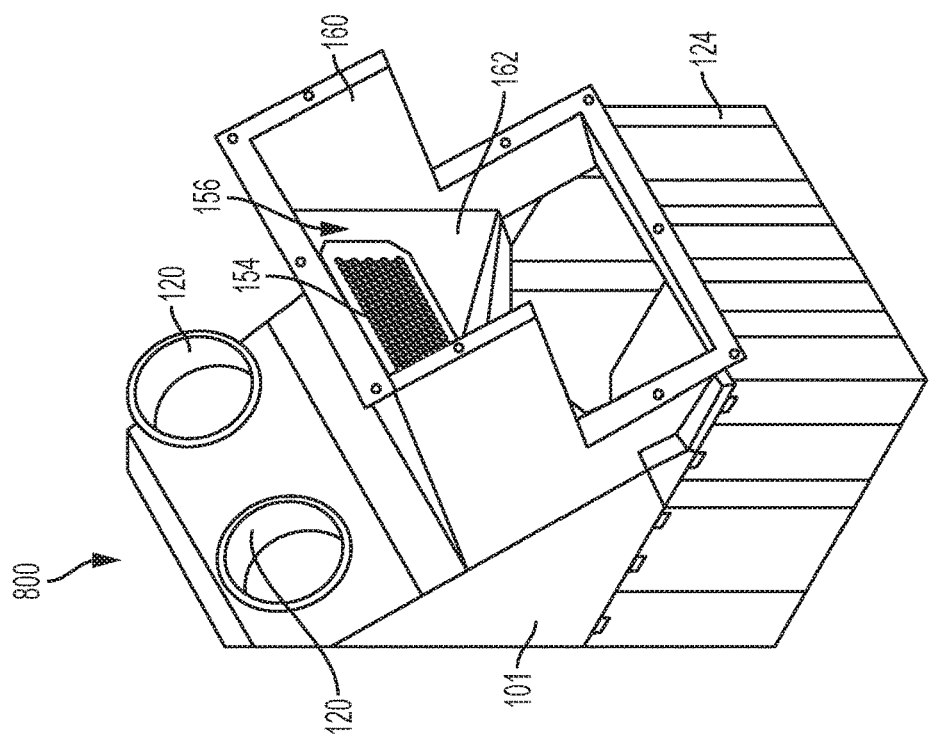
FIG. 8 is a perspective view of a dust control system according to an embodiment of the invention.
Figure 10:
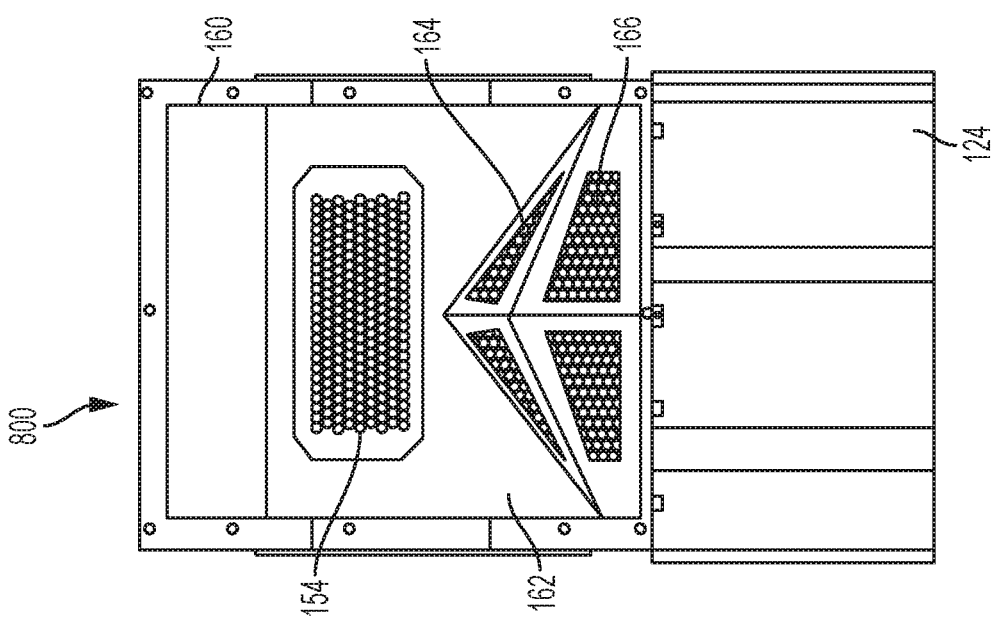
FIG. 10 is a front view of a dust control system according to an embodiment of the invention.

According to one embodiment, as shown by the perspective views of FIGS. 8-9 and front views of FIG. 10, the upstream pick up 156 may be formed of upstream facing walls 162, 166 and downward facing angular walls 164 to avoid collection of proppant and direct the flow of dust laden air through the upstream encasement and into the de-dusting hood 101. The upstream facing walls 160, 166 and downward facing walls 164 may include diffusers 154 or perforations or other similar inducement of a drop in pressure as the dust laden air travels through the system.

Figure 11:
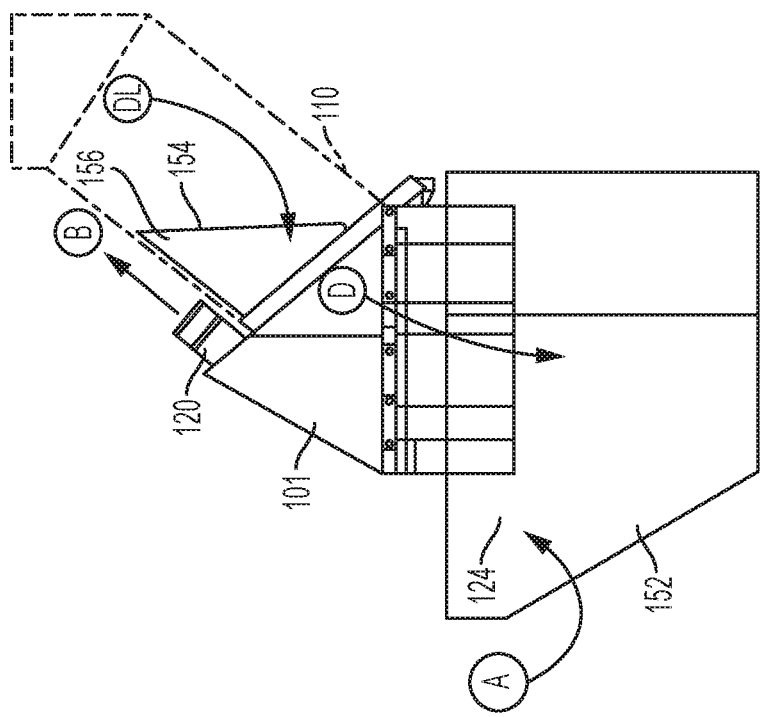
FIG. 11 is a side elevation of a dust control system according to an embodiment of the invention.
Figure 12:
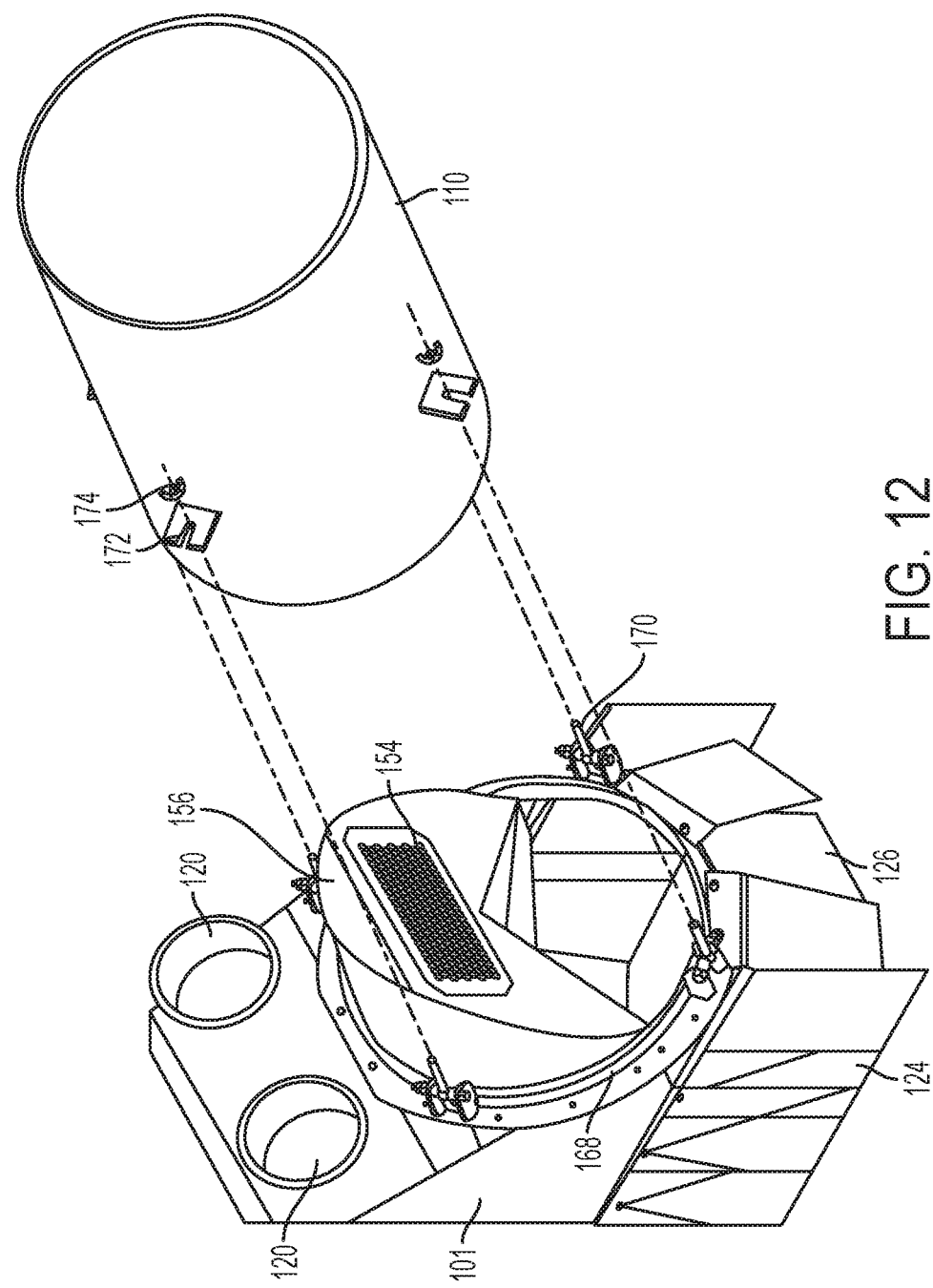
FIG. 12 is a exploded view of a dust control system according to an embodiment of the invention.

FIGS. 11-12 depict a dust control system 1100 according to one embodiment of the present invention. The dust control system 1100 may include a de-dusting hood 101, dust receptacle 120, flexible curtain 124 and receiving hopper 152 as previously described. The present embodiment may include an upstream dust pick up 156 extending from the rear wall of the de-dusting hood 101. A delivery chute 110 may be affixed directly to the de-dusting hood 101 whereby the upstream dust pick up 156 is surrounded by the chute 110. As shown in the exploded view of FIG. 12, the chute 110 may be coupled or affixed to a mounting bracket 168 of the de-dusting hood 101. The mounting bracket may include bolts 170 for receiving flanges 172 of the chute and fasteners, such as nuts 174. In the closed environment of the present invention, proppant and dust laden air may flow through the delivery chute 110 whereby the heavier proppant flows along the bottom of the chute 110, down through the de-dusting hood and flexible curtains 124 and into the receiving hopper 152. The lighter and more air-borne dust laden air may flow along the upper portion of the chute 110 until it meets the diffuser 154 of the upstream pick-up 156 where the dust laden air undergoes a pressure drop as it passes into the de-dusting hood, where it is subsequently drawn up to the dust receptacles 120 by the suction force of an air mover and an updraft of ambient air A.

The embodiments described herein include systems with a de-dusting hood with flexible air curtains and proppant discharge chute, or chute cover, that shape the source airflow entering the area above the receiving hopper to control the flow direction of dust-laden air. The described embodiments create less turbulent air currents to keep the dust entrained in the air stream while the dust-laden air travels through the ductwork and conduits into a dust collector unit, rather than falling out onto surfaces or entering the atmosphere prior to reaching the receiving hopper.

While embodiments described herein detail a dust control system implemented to collect fine and ultrafine dust created by the movement and transfer of proppant for use in an oilfield fracking operation, one skilled in the art will appreciate that the invention is not so limited and embodiments of the present invention may be implemented in other environments in which collection of air-borne fine and ultrafine particulates is of importance.

Further, while the embodiments described herein detail engaging, affixing, attaching or coupling various components together, one skilled in the art will appreciate that the elements of the described systems may be joined using any know techniques in the art, including friction-fit, straps, clamps, screws, bolts, rivets, adhesives, or other fastening techniques. Nothing in the present disclosure should limit the manner in which the detailed components are engaged with each other.

The foregoing disclosure and description of the invention is illustrative and explanatory of the embodiments of the invention. Various changes in the details of the illustrated embodiments can be made within the scope of the appended claims without departing from the true spirit of the invention. The embodiments of the present invention should only be limited by the following claims and their legal equivalents.

What is claimed is:

1. A system for capturing dust particles while minimizing the capture of usable proppant, the system comprising:
    a hood assembly in fluid communication with a delivery chute;
    a dust receptacle coupled to the hood assembly, the dust receptacle in fluid communication with a duct configured to provide suction to the hood assembly;
    an upstream de-dusting encasement affixed to the hood assembly, the upstream de-dusting encasement coupled to the delivery chute, the upstream de-dusting encasement sized and shaped to match a geometry of the delivery chute;
    a diffuser screen coupled to the upstream-de-dusting encasement upstream of the hood assembly; and
    a de-dusting air-intake coupled to the upstream de-dusting encasement configured to produce suction upstream of the hood assembly separating the dust particles from the usable proppant in the upstream de-dusting encasement.

2. The system of claim 1 further comprising a pick-up shaped to match the geometry of the delivery chute and affixed to the hood assembly, the pick-up extending upstream of the hood assembly.

3. The system of claim 2 further comprising the diffuser screen disposed on an upstream facing wall of the pick-up.

4. The system of claim 1 wherein the de-dusting encasement is coupled to the delivery chute by a plurality of straps extending around the delivery chute.

5. The system of claim 1 wherein the de-dusting encasement is coupled to the delivery chute by a plurality of clamps.

6. The system of claim 1 wherein the fastener comprises the de-dusting encasement is coupled to the delivery chute by a supporting bracket.

7. The system of claim 1 further comprising a flexible curtain affixed to a lower portion of the hood assembly.

8. The system of claim 7 wherein the flexible curtain extends partially around a perimeter of the lower portion of the hood assembly.

9. The system of claim 1 further comprising a flexible curtain affixed to a rear, lower portion of the hood assembly.

10. The system of claim 1 further comprising an auxiliary suction hood coupled to the hood assembly, the auxiliary suction hood in fluid communication with the duct.

11. The system of claim 1 further comprising a collector in fluid communication with the dust receptacle.

12. The system of claim 11 wherein the duct establishes fluid communication between the dust receptacle and the collector.

13. The system of claim 1 wherein the duct comprises a plurality of vents.

14. The system of claim 13 wherein the vents are disposed on a top side and on first and second opposing sides of the upstream de-dusting encasement.

15. The system of claim 13 wherein the vents are adjustable.

16. A dust collection assembly for collecting dust-laden air produced by agitation of a particulate material, the dust collection assembly comprising:
    a hood assembly in fluid communication with a delivery chute;
    a dust receptacle coupled to the hood assembly, the dust receptacle in fluid communication with a duct configured to provide suction to the hood assembly;
    an upstream pick-up affixed to and extending upstream from the hood assembly, an upper portion of the upstream pick-up sized and shaped to match an internal geometry of the delivery chute, the upstream pick-up comprising a diffuser screen in an upstream-facing wall;
    an air intake in fluid communication with the upstream pickup configured to produce suction upstream of the hood assembly separating the dust-laden air from the particulate material in the upstream pickup;
    a receiving fastener affixed to the hood assembly and configured to receive and secure the delivery chute to the hood assembly.

17. The dust collection assembly of claim 16 further comprising a curtain affixed to a perimeter of a lower portion of the hood assembly.

18. The dust collection assembly of claim 16 further comprising a flexible curtain affixed to at least one side of a lower portion of the hood assembly.

\* \* \* \* \*